A. R. DENLINGER.
Fumigators for Bee-Hives.
No. 139,881. Patented June 17, 1873.
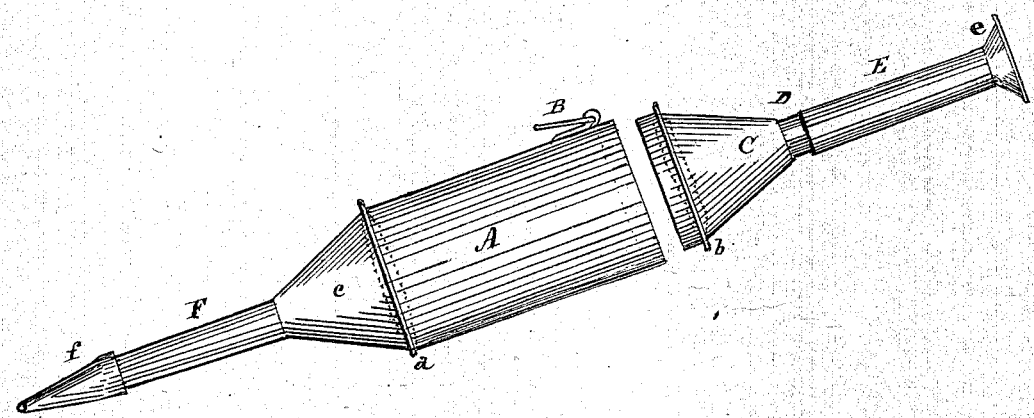
Witnesses.
Inventor.

UNITED STATES PATENT OFFICE.

ABRAHAM R. DENLINGER, OF GORDONVILLE, PENNSYLVANIA.

IMPROVEMENT IN FUMIGATORS FOR BEE-HIVES.

Specification forming part of Letters Patent No. 139,881, dated June 17, 1873; application filed May 9, 1873.

*To all whom it may concern:*

Be it known that I, ABRAHAM R. DENLINGER, of Gordonville, in the county of Lancaster and State of Pennsylvania, have invented a certain Apparatus for Taming Bees, of which the following is a specification:

The object of my invention is to provide a simple and efficient means to convey smoke made from dry, dosed, or rotten wood, into all parts of a hive or among the bees, without injury to the bees or honey, and yet to have the effect of taming them so as to become perfectly docile, and be easily transferred from one box to another, or for removing the comb in taking honey. The accompanying drawing shows the apparatus, in which—

A is a sheet-iron cylinder of any desired size; this is provided with a perforated bottom or diaphragm, shown by the dotted lines at *a*. This cylinder has a conic base, *c*, which can be made of tinned iron, as also the tube or tubes F *f*. A handle, B, is also shown; this may be made a socket for a wooden handle, if preferred. A top fits into the cylinder forming a cap with its conic part *c*, and tube or tubes D E, and terminal mouth-piece *e*. There is also a diaphragm, *b*, shown in the cap or top *c*; this cap fits into the cylinder and closes the top tightly.

Dry, rotten, or dosed wood, or touch-wood, is placed into the cylinder with a live coal, or lit with a match, and the cap is put on. The decayed wood or combustible material becomes ignited, and by blowing in through the mouth-piece a dense cloud of smoke will be expelled through the conic end *f*, the whole being easily handled and adapted for conveying the smoke to any point. This smoke will effectually tame the bees and cause them to retire from the combs, or take refuge in another box prepared for them.

Experience has proved this to be the most effectual, safe, and easy means for taming bees of any yet known. By using sweet decayed wood for the purpose, the bees speedily recover from its effects, and become as lively as ever, notwithstanding their docility under its influence so as to allow themselves to be freely handled, changed, or their honey-combs removed, without attempting to fly away or to sting. It is also perfectly safe against dropping fire.

I am aware that smoking bees is not new, especially with tobacco, which often proves injurious, yet the means heretofore employed were unsatisfactory, and this simple invention supplies a want long felt.

What I claim as my invention is—

The cylinder A and top C, each provided with a perforated diaphragm, *a b*, and tube or tubes D E F, with the mouth-piece *e*, and conic end *f*, substantially as shown and described, for the purpose specified.

ABRAHAM R. DENLINGER.

Witnesses:
  WM. B. WILEY,
  JACOB STAUFFER.